(12) United States Patent
Hayashi et al.

(10) Patent No.: US 8,060,895 B2
(45) Date of Patent: Nov. 15, 2011

(54) DISK DEVICE TRAY

(75) Inventors: Ryuuji Hayashi, Osaka (JP); Katsuo Ichinohe, Osaka (JP); Shin'ya Yamaguchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 385 days.

(21) Appl. No.: 12/398,283

(22) Filed: Mar. 5, 2009

(65) Prior Publication Data

US 2009/0235291 A1  Sep. 17, 2009

(30) Foreign Application Priority Data

Mar. 11, 2008  (JP) .................. 2008-060692

(51) Int. Cl.
*G11B 17/03* (2006.01)
*G11B 33/02* (2006.01)

(52) U.S. Cl. .............. 720/603; 720/600; 720/601

(58) Field of Classification Search .................. 720/603, 720/600, 601
See application file for complete search history.

(56) References Cited

U.S. PATENT DOCUMENTS

| 5,864,529 A | 1/1999 | Liao et al. |
| 5,930,218 A | 7/1999 | Mitsui et al. |
| 6,370,101 B1 | 4/2002 | Kim |

FOREIGN PATENT DOCUMENTS

| JP | 07-320468 A | 12/1995 |
| JP | 2002-230939 A | 8/2002 |

*Primary Examiner* — Ly D Pham
(74) *Attorney, Agent, or Firm* — Global IP Counselors (57) ABSTRACT

A disk device tray includes a first support component, a second support component and a step component. The first support component has a first support face with a first disk supporting area that supports an outer edge portion of a lower face of a first disk. The second support component has a second support face with a second disk supporting area that supports an outer edge portion of a lower face of a second disk. The step component has an inner side portion protruding upward with respect to an outer side portion. The inner side portion has a top face that is located lower than the second support face and a first inner peripheral face that extends upward from the first support face to the top face and restricts movement of the first disk in a radial direction of the first disk.

15 Claims, 6 Drawing Sheets

Prior Art

*Fig. 7*

Prior Art

*Fig. 8*

DISK DEVICE TRAY

CROSS-REFERENCE TO RELATED APPLICATIONS

This application claims priority to Japanese Patent Application No. 2008-060692 filed on Mar. 11, 2008. The entire disclosure of Japanese Patent Application No. 2008-060692 is hereby incorporated herein by reference.

BACKGROUND OF THE INVENTION

1. Field of the Invention

The present invention generally relates to a disk device tray. More specifically, the present invention relates to a disk device tray for a disk device.

2. Background Information

Figure 7:
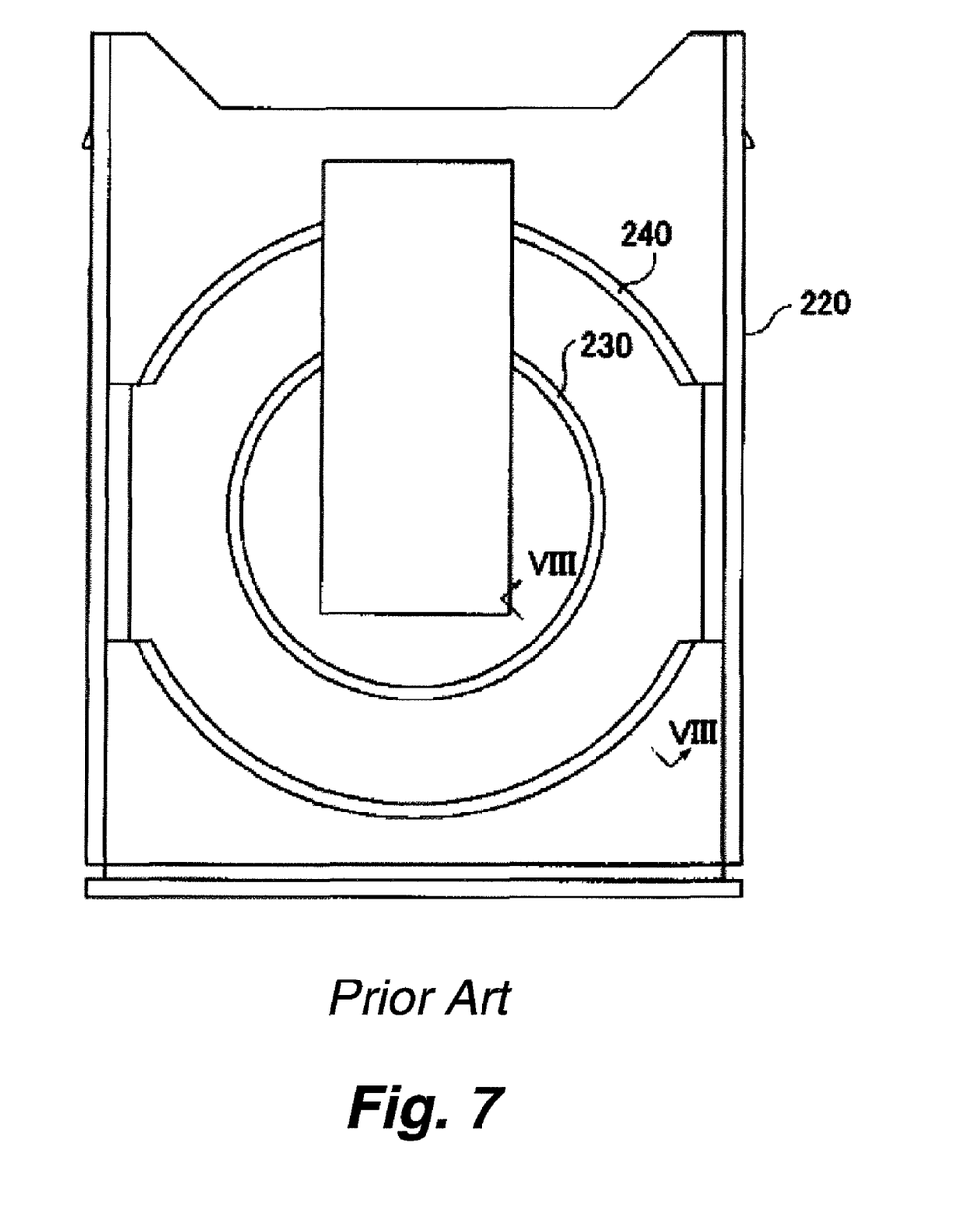
FIG. 7 is a top plan view of a tray in accordance with a prior art.
Figure 8:
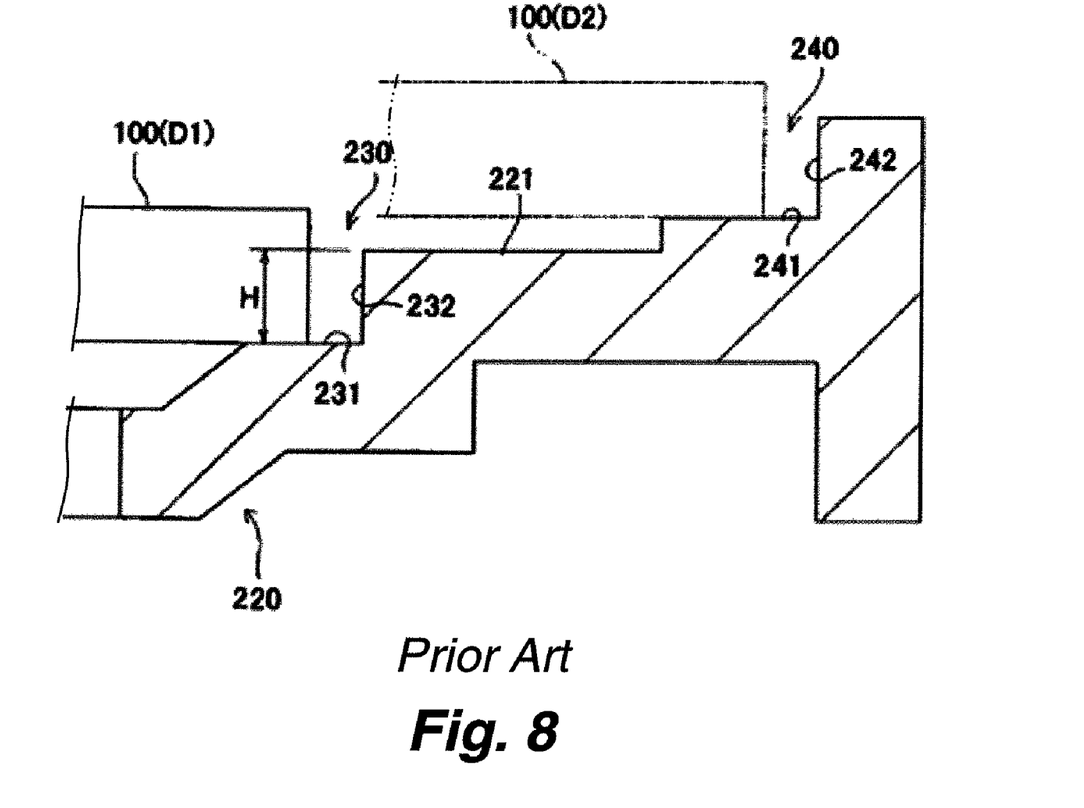
FIG. 8 is a cross sectional view of the tray taken along VIII-VIII line illustrated in FIG. 7.

As shown in FIGS. 7 and 8, a conventional disk device includes a tray 220 on which two kinds of disk of different diameter (e.g., a small-diameter disk D1 and a large-diameter disk D2) can be placed. The tray 220 has first and second annular support components 230 and 240 formed at two concentric locations of the tray 220. An outer peripheral part of the small-diameter disk D1 is placed on the first support component 230, and an outer peripheral part of the large-diameter disk D2 is placed on the second support component 240.

The first support component 230 has a support face 231 on which is placed the outer peripheral part of the lower face of the small-diameter disk D1, and a cylindrical upright face 232 that contacts with an outer peripheral end face of the small-diameter disk D1 and thereby prevents the misalignment of the small-diameter disk D1. Similarly, the second support component 240 has a support face 241 on which is placed the outer peripheral part of the lower face of the large-diameter disk D2, and a cylindrical upright face 242 that contacts with an outer peripheral end face of the large-diameter disk D2 and thereby prevents the misalignment of the large-diameter disk D2. The diameters of the cylindrical upright faces 232 and 242 of the first and second support components 230 and 240 are somewhat larger than the diameters of the corresponding disks, which makes it easier to place and remove the disks in the first and second support components 230 and 240. Also, an upper end position of the upright face 232 of the first support component 230 is located at a lower level than the support face 241 of the second support component 240. This keeps a recording region of the large-diameter disk D2 placed on the second support component 240 in a state of non-contact with a flat upper face 221 of the tray 220 and prevents it from being scratched or otherwise damaged.

With the disk device, the disk that has been placed on the tray 220 and loaded is clamped by a clamping mechanism and lifted up from the tray 220. Then, the disk rotates in this state, a recording face of the disk is optically processed through the action of an optical pickup or the like, and information is thereby recorded or reproduced. Also, the disk is moved to the tray 220 as soon as it is unclamped from the clamping mechanism.

Furthermore, with the disk device, the depth of the first support component 230, that is, the height H that the upright face 232 rises from the support face 231, is less than the thickness of the small-diameter disk D1. As a result, the tray 220 can be made thinner and, in turn, so can the disk device.

Meanwhile, supporting the large-diameter disk D2 on pads affixed to a tray has been proposed as a way to reduce the thickness of the tray when two kinds of disks of different diameter are used (see Japanese Laid-Open Patent Application Publication No. 2002-230939, for example).

The pads are affixed at a plurality of places on outside of a support component of the small-diameter disk D1. The large-diameter disk D2 is placed on the pads.

With the conventional disk device shown in FIGS. 7 and 8, the rise height H of the upright face 232 of the first support component 230 is set to be less than the thickness of the small-diameter disk D1. This allows the tray 220 to be thinner, and in turn allows the overall disk device to be thinner. However, this makes it difficult to ensure that the upright face 232 has an adequate contact height (corresponds to the rise height H of the upright face 232) with respect to the outer peripheral end face of the small-diameter disk D1. Accordingly, when the tray 220 is tilted because the disk device is tilted away from the horizontal orientation, the outer peripheral end face of the small-diameter disk D1 that has been moved from a turntable of the clamping mechanism to the tray 220 upon the unclamping of the clamping mechanism does not always catch on the upright face 232, and instead rides up over the upright face 232. If this happens, the small-diameter disk D1 will shift away from a proper position in the tray 220 (the position where the entire small-diameter disk D1 fits into the annular first support component 230), and the small-diameter disk D1 may catch on a housing frame of the disk device, etc., in the midst of the tray 220 being unloaded to the outside of the housing frame, thereby causing a malfunction.

One effective way of dealing with this is to lower the position of the support face 231 of the first support component 230 and increase the rise height H that the upright face 232 rises from the support face 231. However, if this is done, it may make it difficult to reduce the thickness of the tray 220 and, in turn, the entire disk device.

With the tray having the pads, the height that an upright face of the support component for the small-diameter disk D1 rises from a support face is increased by the thickness of the pads. Therefore, when the small-diameter disk D1 is placed on the support face, the contact area with respect to the outer peripheral end face of the small-diameter disk D1 is larger. However, since the pads have to be attached to the tray, the number of required parts increases, and not only does this make the assembly process more complicated, but the recording region of the large-diameter disk D2 contacts with the pads. Accordingly, even if a soft material is used for the pads, there is still the risk that the recording region will be scratched or otherwise damaged.

In view of the above, it will be apparent to those skilled in the art from this disclosure that there exists a need for an improved disk device tray. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a disk device tray with which a recording region of a disk can be prevented from being damaged and misalignment of the disk can be prevented.

In accordance with one aspect of the present invention, a disk device tray includes a first support component, a second support component and a step component. The first support component has a first support face with a first disk supporting area that is arranged to support an outer edge portion of a lower face of a first disk. The second support component is concentrically formed with respect to the first support component and has a second support face with a second disk supporting area that is arranged to support an outer edge portion of a lower face of a second disk with the second disk supporting area having a larger diameter than the first disk supporting area. The step component is formed between the first and second support components and has an outer side portion and an inner side portion that is located inward with respect to the outer side portion and that protrudes upward with respect to the outer side portion. The inner side portion has a top face that is located lower than the second support face of the second support component and a first inner peripheral face that extends upward from the first support face to the top face of the inner side portion and is arranged to restrict movement of the first disk in a radial direction of the first disk on the first support face.

With the disk device tray of the present invention, it is possible to provide a disk device tray with which a recording region of a disk can be prevented from being damaged and misalignment of the disk can be prevented.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention is provided for illustration only and not for the purpose of limiting the invention as defined by the appended claims and their equivalents.

Referring to FIGS. 1-6, a disk device in accordance with one embodiment will now be described. The disk device includes a housing frame 10, a tray 20, first and second annular support components 30 and 40, a clamping mechanism 50 and a thicker portion 60. The tray 20 is slidably attached to the housing frame 10 to move in and out between retracted and retracted positions. A disk 100 is placed on the tray 20, and is loaded and unloaded between inside and outside of the housing frame 10. The disk 100 is a recording medium, such as CD, DVD and BD. The disk 100 is clamped and lifted up from the tray 20 by the clamping mechanism 50. The disk 100 is rotated in this state, a recording face of the disk is optically processed through the action of an optical pickup or the like, and information is thereby recorded or reproduced.

Figure 1:
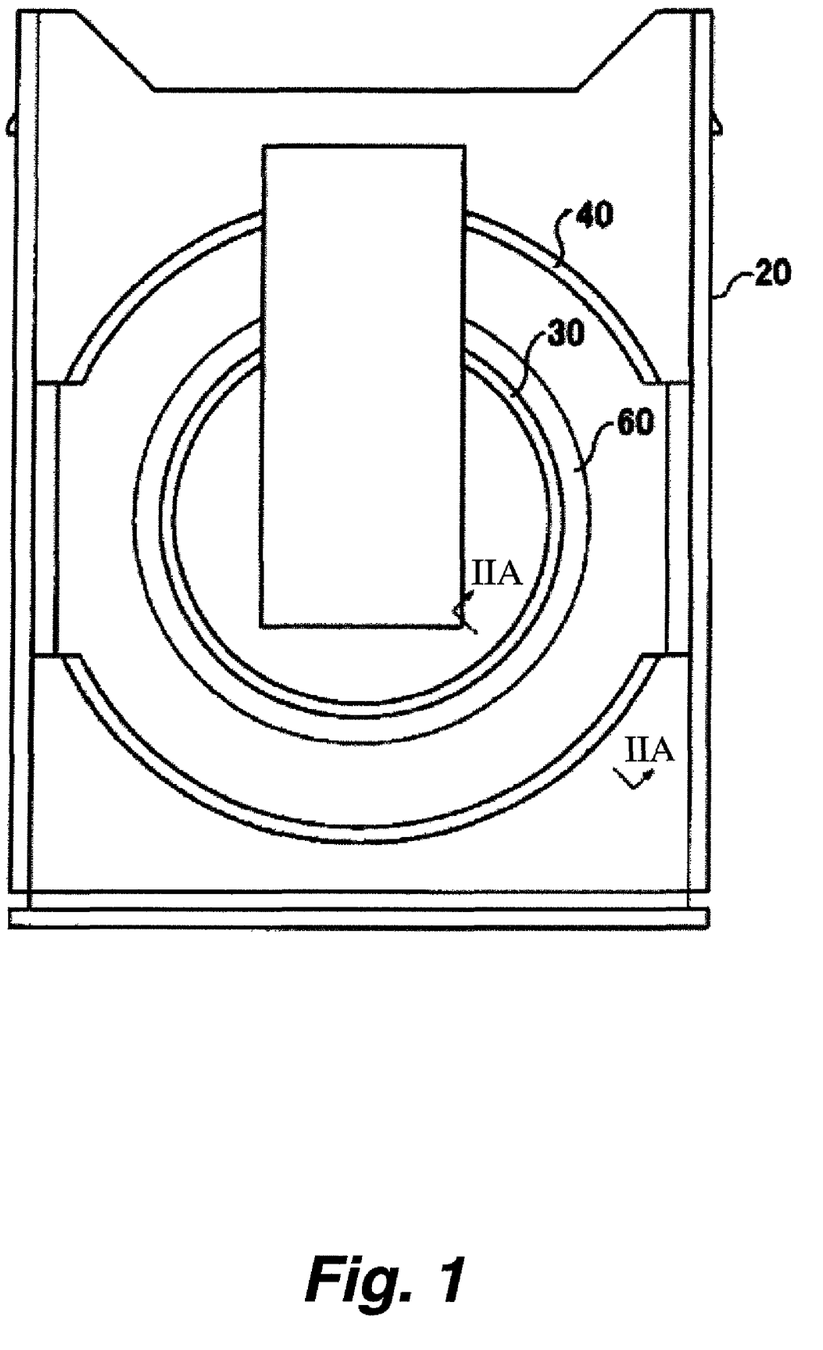
FIG. 1 is a top plan view of a tray in accordance with one embodiment of the present invention.

With the disk device, at least two kinds of disk of different diameter (e.g., small-diameter disk D1 and large-diameter disk D2) are used. The first and second annular support components 30 and 40 are formed at two concentric locations of the tray 20. An outer peripheral part of the small-diameter disk D1 is placed on the first support component 30, and an outer peripheral part of the large-diameter disk D2 is placed on the second support component 40.

Figure 4:
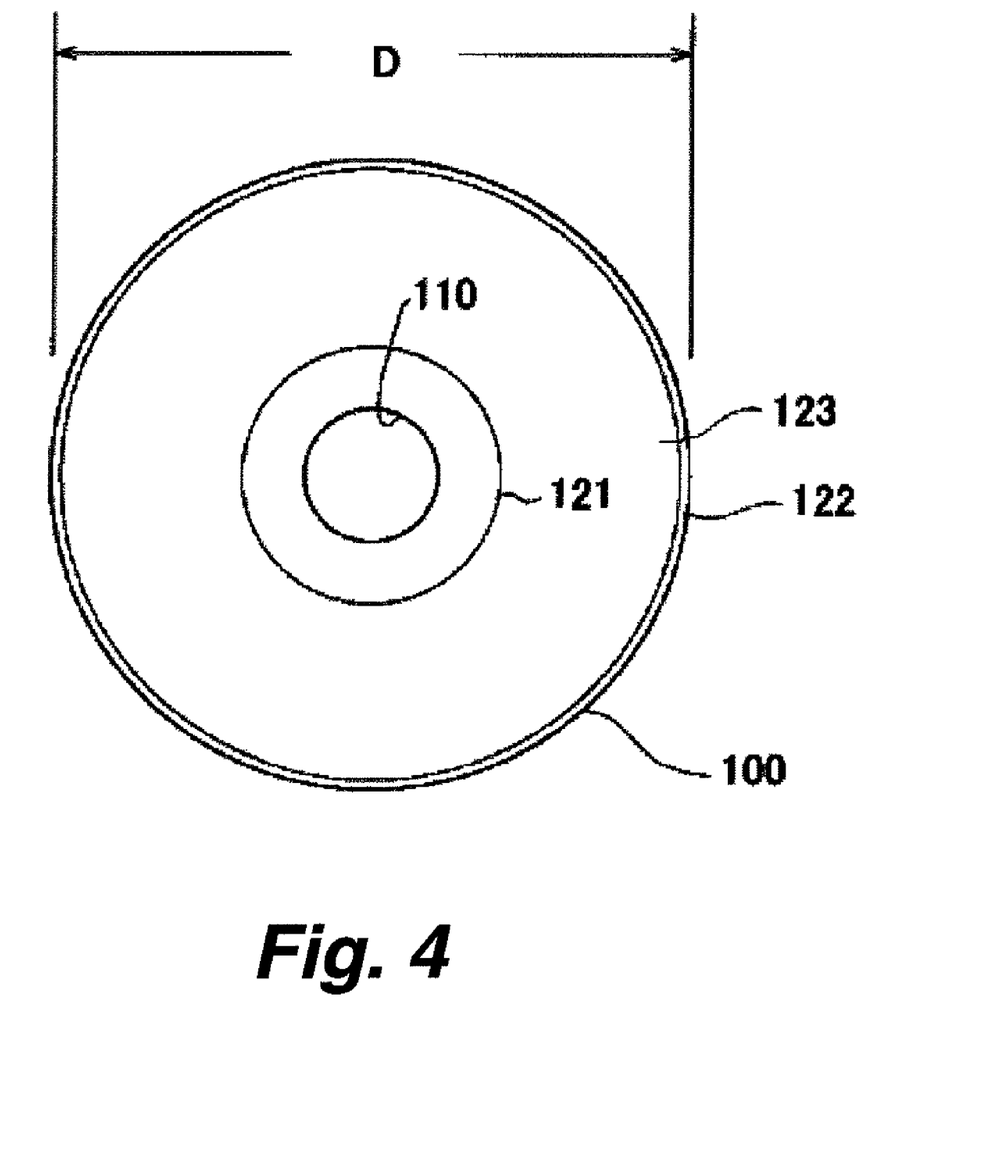
FIG. 4 is a top plan view of a disk.

FIG. 4 is a plan view of the disk 100 as seen from the recording face side. The disk 100 has non-recording regions 121 and 122 at two places, namely, the outer peripheral part and around a center hole 110. A recording region 123 is provided in an annular region between the non-recording regions 121 and 122. If the recording region 123 should be scratched or otherwise damaged, this can diminish the recording and reproducing performance of the disk 100. Accordingly, the non-recording region 122 at the outer peripheral portion of the disk 100 is utilized to place the disk 100 on the tray 20. Also, with two kinds of disk 100 of different diameter D, the small-diameter disk D1 is standardized at 8 cm, and the large-diameter disk D2 at 12 cm. Therefore, the small-diameter disk D1 is supported by being placed on the first support component 30 on the inside of the tray 20, while the large-diameter disk D2 is supported by being placed on the second support component 40 on the outside of the tray 20.

Figure 2A:
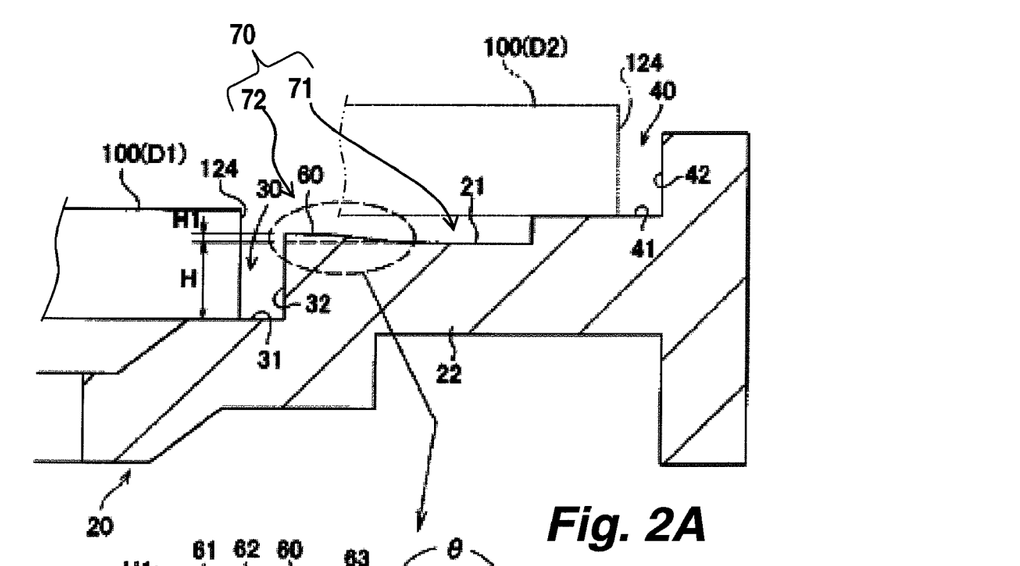
FIG. 2A is a cross sectional view of the tray taken along IIA-IIA line illustrated in FIG. 1.
Figure 2B:
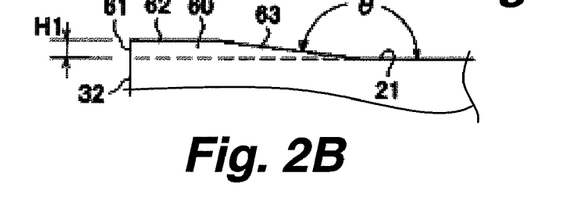
FIG. 2B is a detail cross sectional view of a thicker portion of the tray illustrated in FIG. 1.
Figure 3:
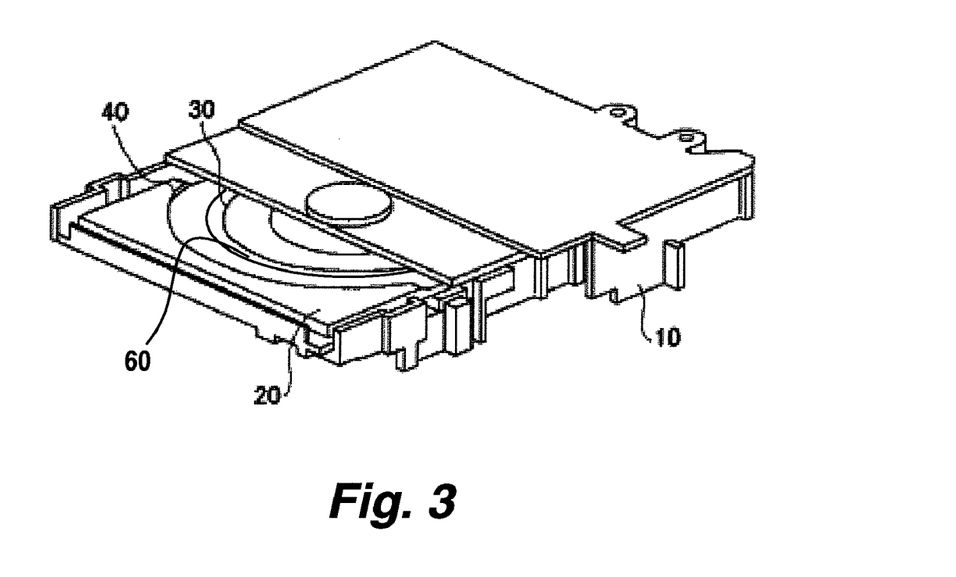
FIG. 3 is a perspective view of a disk device having the tray illustrated in FIG. 1.

As shown in FIGS. 1 and 2, the first support component 30 has a support face 31 on which is placed the outer peripheral part of the lower face of the small-diameter disk D1 (the face on which the non-recording region 122 is formed), and a cylindrical upright face 32 that contacts with the outer peripheral end face 124 of the small-diameter disk D1 and thereby prevents the misalignment of the small-diameter disk D1. Specifically, the support face 31 has a disk supporting area (e.g., first disk supporting area) that is arranged to support the outer peripheral part of the lower face of the small-diameter disk D1. Similarly, the second support component 40 has a support face 41 on which is placed the outer peripheral part of the lower face of the large-diameter disk D2 (the face on which the non-recording region 122 is formed), and a cylindrical upright face (e.g., second inner peripheral face) 42 that contacts with the outer peripheral end face 124 of the large-diameter disk D2 and thereby prevents the misalignment of the large-diameter disk D2. In other words, the upright face 42 extends upward from the support face 41 and restricts movement of the large-diameter disk D2 in a radial direction of the large-diameter disk D2. Specifically, the support face 41 has a disk supporting area (e.g., second disk supporting area) that is arranged to support the outer peripheral part of the lower face of the large-diameter disk D2. The disk supporting area of the support face 41 has a larger diameter than the disk supporting area of the support face 31. The diameters of the cylindrical upright faces 32 and 42 of the first and second support components 30 and 40 are somewhat larger than the diameters of the corresponding disks 100, which makes it easier to place and remove the disks 100 in the first and second support components 30 and 40. Also, an upper end position of the upright face 32 of the first support component 30 is located at a lower level than the support face 41 of the second support component 40. This keeps the recording region 123 of the large-diameter disk D2 placed on the second support component 40 in a state of non-contact with a flat upper face 21 of the tray 20 and prevents it from being scratched or otherwise damaged.

With the disk device, the disk 100 that has been placed on the tray 20 and loaded is clamped by the clamping mechanism 50 and lifted up from the tray 20. Then, the disk 100 rotates in this state, the recording face of the disk 100 is optically processed through the action of the optical pickup or the like, and information is thereby recorded or reproduced. Also, the disk 100 is moved to the tray 20 as soon as it is unclamped from the clamping mechanism 50.

Figure 5:
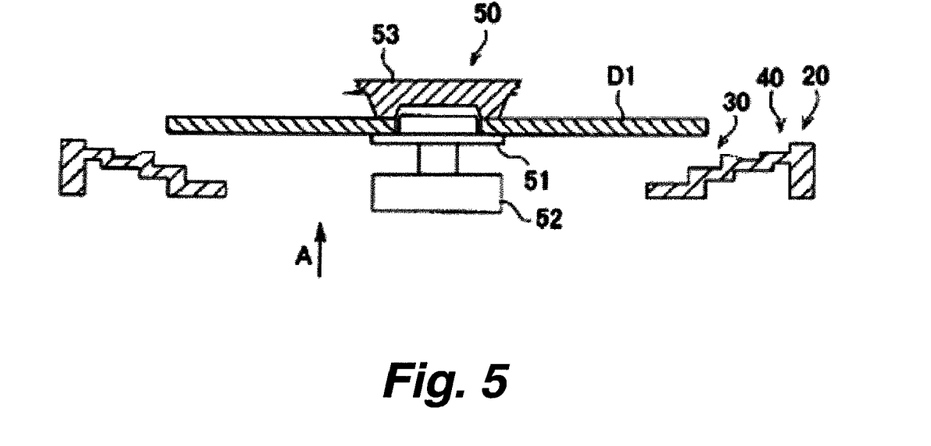
FIG. 5 illustrates a state in which a small-diameter disk has been clamped by a clamping mechanism of the disk device.
Figure 6:
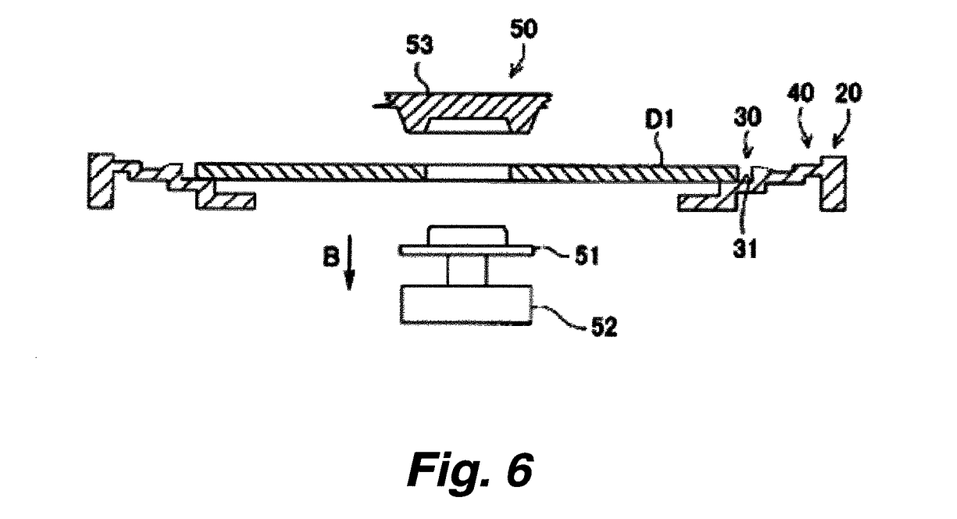
FIG. 6 illustrates a state in which the small-diameter disk is moved to the tray illustrated in FIG. 1.

FIG. 5 illustrates a state in which the small-diameter disk D1 has been lifted up from the tray 20 and clamped by the clamping mechanism 50. FIG. 6 illustrates a state in which the small-diameter disk D1 is moved to the tray 20 upon being unclamped from the clamping mechanism 50. As shown in FIGS. 5 and 6, the clamping mechanism 50 has a turntable 51 that is on stand-by under the loading position of the small-diameter disk D1, and a damper 53 that is on stand-by above the loading position. The turntable 51 is rotationally driven by a motor 52. The clamping mechanism 50 operates as follows. When the small-diameter disk D1 is placed on the tray 20 and moved the loading position, the turntable 51 moves up as indicated by the arrow A in FIG. 5 and accepts the small-diameter disk D1 resting on the tray 20. Then, the small-diameter disk D1 is clamped in the damper 53. When the turntable 51 moves down, the small-diameter disk D1 is unclamped from the clamping mechanism 50, and the small-diameter disk D1 is then moved from the turntable 51 to the tray 20 by the downward movement of the turntable 51, as indicated by the arrow B in FIG. 6. When the clamping mechanism 50 is unclamped, the small-diameter disk D1 that had been moved from the turntable 51 to the tray 20 is placed with the lower face of the outer peripheral part, on which the non-recording region 122 is formed, on the support face 31 of the first support component 30. Accordingly, the small-diameter disk D1 moved to the tray 20 fits loosely in the first support component 30 as shown in FIG. 6.

With the disk device, the first and second support components 30 and 40 are contiguous with inner and outer sides of a thin bottom plate 22 of the tray 20. Furthermore, the upper face of the bottom plate 22 corresponds to the flat upper face 21. In other words, the tray 20 includes a step portion 70 formed between the first and second support components 30 and 40. The step portion 70 is formed in an annular shape. The first and second support components 30 and 40 and the step portion 70 are integrally formed from resin as a one-piece, unitary member. The step portion 70 includes an outer side portion 71 and an inner side portion 72. The inner side portion 72 is located inward with respect to the outer side portion 71 and protrudes upward with respect to the outer side portion 71.

The tray 20 further includes an annular thicker portion 60 at the inner side portion 72. The thicker portion 60 is formed from a resin integrally with the tray 20 as a one-piece, unitary member, at the outer peripheral portion of the first support component 30. The thicker portion 60 has an inner peripheral face 61 and a top face 62. The inner peripheral face 61 is completely contiguous with the upright face 32. In other words, the upright face 32 and the inner peripheral face 61 forms an inner peripheral face (e.g., first inner peripheral face) of the inner side portion 72 that restrict movement of the small-diameter disk D1 in a radial direction of the small-diameter disk D1. The inner peripheral face of the inner side portion 72 has an upper circular edge disposed parallel to a lower circular edge.

Also, the top face 62 of the thicker portion 60 is a flat, annular face. The top face 62 is located at a lower level than the support face 41 of the second support component 40. In other words, the top face 62 of the thicker portion 60 is set to a location where it will not contact with the lower face of the large-diameter disk D2, the outer peripheral part of whose lower face is placed on the second support component 40. Since the top face 62 of the thicker portion 60 is located at the lower level than the support face 41 of the second support component 40, when the lower face of the outer peripheral part of the large-diameter disk D2 is placed on the support face 41 of the second support component 40, there is no risk that the thicker portion 60 will contact with the recording region 123 of the large-diameter disk D2 and scratch or otherwise damage it. Furthermore, since the thicker portion 60 is formed of resin integrally with the tray 20, there is no increase in the number of required parts, nor is the assembly process more complicated.

Furthermore, the thicker portion 60 is formed in the annular shape. Since the inner peripheral face 61 of the thicker portion 60 that is completely contiguous with the upright face 32 of the first support component 30 is also in an annular shape, no matter in which direction the tray 20 is tilted, the upright face 32 of the first support component 30 and the inner peripheral face 61 of the thicker portion 60 will serve to prevent misalignment of the small-diameter disk D1. This is achieved even more reliably by setting the increase in height of the upright face 32 due to the inner peripheral face 61 of the thicker portion 60 to be the same as the portion all the way around the upright face 32.

The thickness H1 of the thicker portion 60 is added to the rise height H of the upright face 32. Thus, the upright face 32 is increased by the thickness H1 of the thicker portion 60 all the way around the upright face 32. Accordingly, the contact area with respect to the outer peripheral end face 124 of the small-diameter disk D1 that is fitted into the first support component 30 and placed on the support face 31 thereof is the sum of the rise height H of the upright face 32 and the thickness H1 of the thicker portion 60. Therefore, once the small-diameter disk D1 has been fitted into the first support component 30 upon the unclamping of the clamping mechanism 50, it is unlikely to ride up over the thicker portion 60 and move away from the proper position. This is achieved not only when the tray 20 is kept in a horizontal orientation, but also when it has been tilted in any direction away from the horizontal orientation. Therefore, this prevents the small-diameter disk D1 from catching on the housing frame 10, etc., in the midst of the tray 20 being unloaded to the outside of the housing frame 10, and from causing a malfunction.

With the disk device, the small-diameter disk D1 is prevented from moving away from the proper position when the tray 20 is tilted. Furthermore, the upper face 21 of the bottom plate 22 of the tray 20 or the top face 62 of the thicker portion 60 will not contact with the lower face of the large-diameter disk D2 when the outer peripheral part of the lower face of the large-diameter disk D2 is placed on the second support component 40. Thus, even if the large-diameter disk D2 should have some axial runout during rotation when it has been clamped by the clamping mechanism 50 and lifted up from the tray 20, there is no danger that the large-diameter disk D2 will rub against the upper face 21 of the bottom plate 22 of the tray 20 or against the top face 62 of the thicker portion 60, which would adversely affect performance.

Further, as shown in FIG. 2, the thicker portion 60 has an annular inclined face (e.g., slope face) 63. The inclined face 63 has a downward slope that extends outward from the top face 62 and is contiguous with the upper face 21 of the bottom plate 22. Accordingly, there is less concentration of load at the base of the thicker portion 60 than when the thicker portion 60 rises up at a right angle from the upper face 21 of the bottom plate 22. Therefore, it is less likely that the bottom plate 22 of the tray 20 will crack at the base of the thicker portion 60. Also, since the thicker portion 60 acts as a reinforcing rib that reinforces the first support component 30, an advantage is that the thickness of the tray 20 can be reduced while still affording the required strength to the first support component 30. In particular, the aperture angle θ between the annular inclined face 63 and the upper face 21 of the bottom plate 22 is set to an obtuse angle that is greater than 135 degrees. Doing this results in the annular inclined face 63 and the upper face 21 of the bottom plate 22 appearing to be substantially continuous horizontally, and even if the thickness of the bottom plate 22 is reduced, the bottom plate 22 of the tray 20 will be unlikely to crack at the base of the thicker portion 60. Furthermore, the closer the aperture angle θ between the annular inclined face 63 and the upper face 21 of the bottom plate 22 is to 180 degrees, the better, but if it is too close to 180 degrees, the bottom plate 22 will end up being substantially thicker, and the action of the thicker portion 60 as a reinforcing rib will be less pronounced.

With the disk device, there is no risk of the large-diameter disk D2 being damaged in the recording region 123, or of the tray 20 becoming thicker. Furthermore, the contact area with respect to the outer peripheral end face of the small-diameter disk D1 can securely prevent misalignment of the small-diameter disk D1 without entailing an increase in the number of required parts. Thus, even if the tray 20 is made thinner, the small-diameter disk D1 will not become misaligned, which would hamper the smooth loading and unloading of the tray 20.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a disk device equipped with the present invention. Accordingly, these terms, as utilized to describe the present invention should be interpreted relative to a disk device equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A disk device tray comprising:
   a first support component having a first support face with a first disk supporting area that is arranged to support an outer edge portion of a lower face of a first disk;
   a second support component concentrically formed with respect to the first support component and having a second support face with a second disk supporting area that is arranged to support an outer edge portion of a lower face of a second disk with the second disk supporting area having a larger diameter than the first disk supporting area; and
   a step component formed between the first and second support components and having an outer side portion and an inner side portion that is located inward with respect to the outer side portion and that protrudes upward with respect to the outer side portion, the inner side portion having a top face that is located lower than the second support face of the second support component and a first inner peripheral face that extends upward from the first support face to the top face of the inner side portion and is arranged to restrict movement of the first disk in a radial direction of the first disk on the first support face,
   an upper circular edge of the inner peripheral face being disposed parallel to a lower circular edge of the inner peripheral face.

2. The disk device tray according to claim 1, further comprising
   a second inner peripheral face extending upward from the second support face and arranged to restrict movement of the second disk in a radial direction of the second disk on the second support face.

3. The disk device tray according to claim 2, wherein the first and second support components and the step component are integrally formed from resin as a one-piece, unitary member.

4. The disk device tray according to claim 3, wherein the first support face supports the outer edge portion of the lower face of the first disk when a clamping mechanism releases the first disk that has been clamped by the clamping mechanism and held above the first support face.

5. The disk device tray according to claim 1, wherein the top face of the inner side portion of the step component is located such that the top face of the inner side portion of the step component does not contact with the lower face of the second disk when the second disk is supported on the second support face of the second support component.

6. The disk device tray according to claim 5, wherein the step component is formed in an annular shape.

7. The disk device tray according to claim 6, wherein the inner side portion of the step component further has a slope face that extends downward from the top face of the inner side portion of the step component towards a top face of the outer side portion of the step component.

8. The disk device tray according to claim 1, wherein the step component is formed in an annular shape.

9. A disk device tray comprising:
   a first support component having a first support face with a first disk supporting area that is arranged to support an outer edge portion of a lower face of a first disk;
   a second support component concentrically formed with respect to the first support component and having a second support face with a second disk supporting area that is arranged to support an outer edge portion of a lower face of a second disk with the second disk supporting area having a larger diameter than the first disk supporting area; and a step component formed between the first and second support components and having an outer side portion and an inner side portion that is located inward with respect to the outer side portion and that protrudes upward with respect to the outer side portion, the inner side portion having a top face that is located lower than the second support face of the second support component and a first inner peripheral face that extends upward from the first support face to the top face of the inner side portion and is arranged to restrict movement of the first disk in a radial direction of the first disk on the first support face, the inner side portion of the step component further having a slope face that extends downward from the top face of the inner side portion of the step component towards a top face of the outer side portion of the step component.

10. The disk device tray according to claim 9, further comprising
a second inner peripheral face extending upward from the second support face and arranged to restrict movement of the second disk in a radial direction of the second disk on the second support face.

11. The disk device tray according to claim 10, wherein
the first and second support components and the step component are integrally formed from resin as a one-piece, unitary member.

12. The disk device tray according to claim 11, wherein
the first support face supports the outer edge portion of the lower face of the first disk when a clamping mechanism releases the first disk that has been clamped by the clamping mechanism and held above the first support face.

13. The disk device tray according to claim 9, wherein
the top face of the inner side portion of the step component is located such that the top face of the inner side portion of the step component does not contact with the lower face of the second disk when the second disk is supported on the second support face of the second support component.

14. The disk device tray according to claim 13, wherein
the step component is formed in an annular shape.

15. The disk device tray according to claim 9, wherein
the step component is formed in an annular shape.

* * * * *